Jan. 18, 1944. C. J. MAHERAS 2,339,497
AUTOMATIC VEHICLE OR AIRPLANE CONTROL APPARATUS
Filed Feb. 16, 1942 2 Sheets-Sheet 1
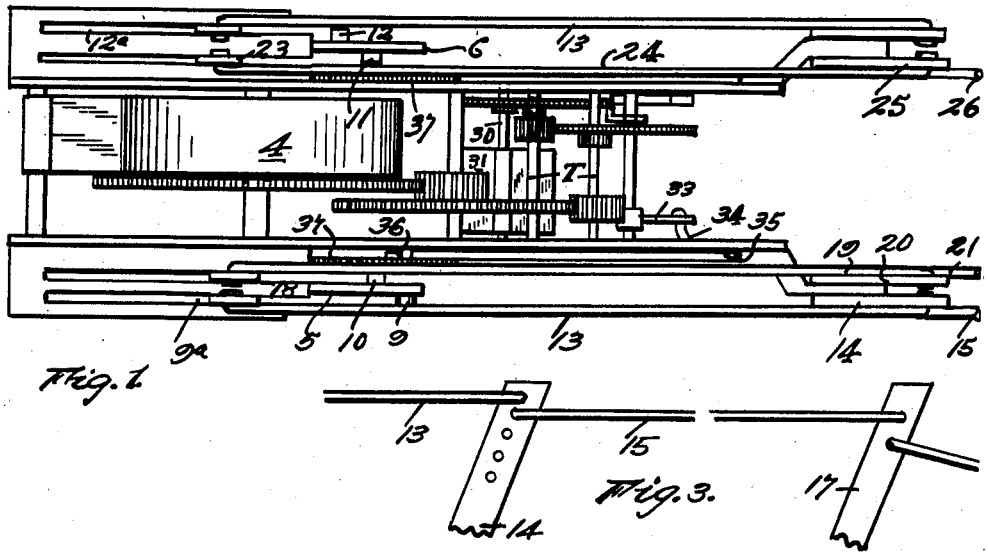
Fig. 1.
Fig. 3.
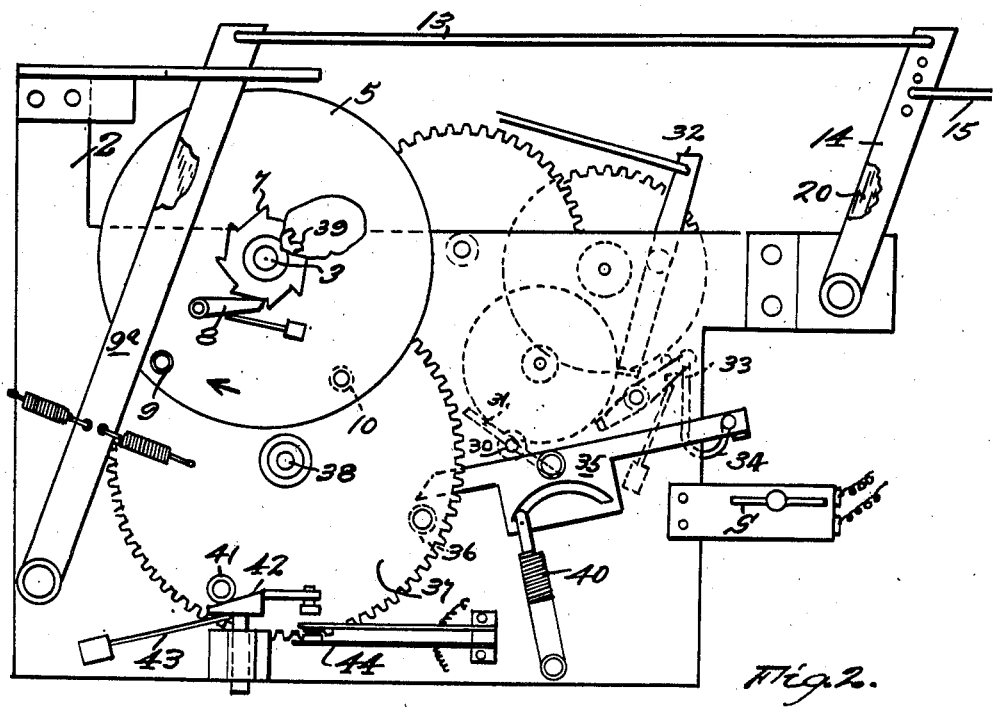
Fig. 2.
Inventor:
Constantinos J. Maheras:
By his Attorney,
Frederick E. Maynard.

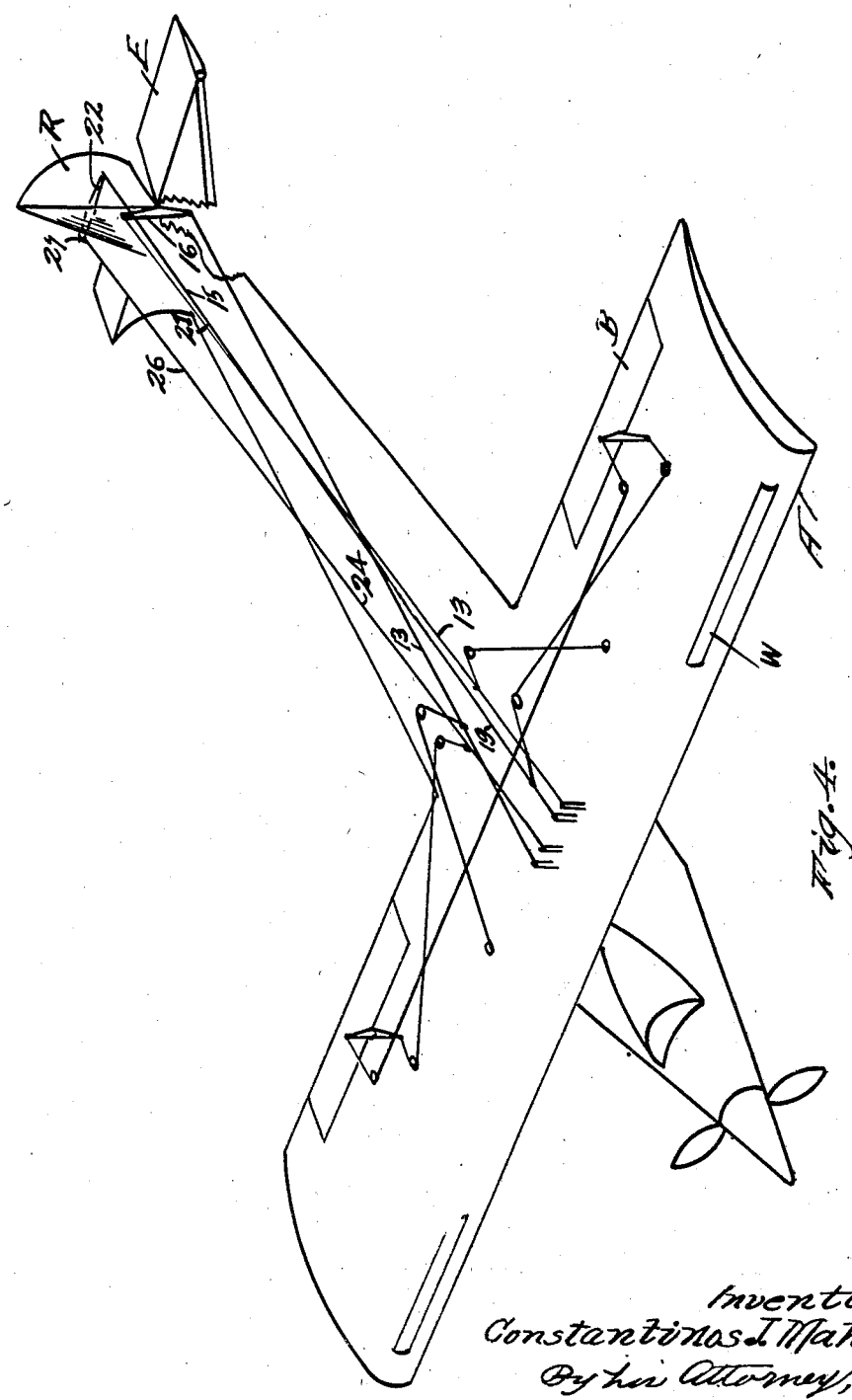

Patented Jan. 18, 1944

2,339,497

UNITED STATES PATENT OFFICE 2,339,497

AUTOMATIC VEHICLE OR AIRPLANE CONTROL APPARATUS

Constantinos J. Maheras, Lomita, Calif.

Application February 16, 1942, Serial No. 431,062

2 Claims. (Cl. 161—1)

This invention is a mechanical and automatic apparatus for the control of various course determining elements of divers types of vehicles, as for instance the automatic control of rudders, ailerons and wing slots of airplanes, and for the control of such other mechanisms as may be desired according to the nature of the vehicle.

It is an object of the invention to provide, in combination with a given vehicle having course controlling elements, a time mechanism whereby to automatically effect the operation of a given element or elements at a desired delayed moment for instance to first actuate the elevators of an airplane (which may be of any style and size) for any desired period and further to effect the operation of the rudder to change the horizontal course as may be desired.

It is an object to provide a time mechanism which may be driven by any desired power means and which may be used also as a source of power to motivate any desired elements or device as well as to control time of its action. The time mechanism may also be used to control operation at a given time of elements or devices which may be motivated by some other source of power than that of the time mechanism.

A further object of the invention is to provide a timing apparatus including a plurality of different speed devices to give a great range of selection of initiation of action of controllable instruments of one kind or another.

It is an object to provide a timing apparatus to govern the controls of either small toy or test models or of large types of airplanes and of other steerable vehicles.

The invention consists in certain advancements in this art as set forth in the ensuing disclosure and having with the above, additional objects and advantages as hereinafter developed, and whose construction, combination and sub-combinations, and details of means, and the manner of operation will be made manifest in the following description of the herewith illustrative embodiment; it being understood that modifications, variations and adaptations may be resorted to within the scope, spirit and principle of the invention as it is more directly claimed presently.

Figure 1 is a top plan of the timing apparatus.

Figure 2 is a side elevation of the apparatus with the cam actuated levers in neutral position.

Figure 3 is a detail of a modified hook-up for indirect transmission of motion from the cam levers to remote elements to be actuated.

Figure 4 is a view of an airplane with rudder, ailerons and elevators controlled by the timing device of the invention.

The apparatus embodies a suitable, substantial frame 2 adapted to be rigidly fixed in the most appropriate position in a given vehicle, as an airplane A, from which the rudder R, the ailerons B, the elevator E and the wing slot shutter device W may be controlled for action at selected periods of time by the timing apparatus.

A master time shaft 3 may be driven by any suitable motor and is here shown as driven by a main spring 4, and it is understood that the shaft may turn in either direction. On this shaft are loosely mounted for quick annular adjustment several slow motion wheels 5 and 6 each driven positively in one direction by respective ratchet wheels 7 fixed on the shaft 3 and engageable by relative clicks 8 pivoted on respective wheels 5 and 6 (the ratchet device being only shown on one side in Fig. 2).

The wheels 5 and 6 are provided with respective cam rollers 9 and 10, and 11 and 12, Fig. 1. The roller 9 is designed to move into engagement with the near edge face of a cam lever 9a, pivoted on the frame, so as to force the lever in one direction and thereby pull on a link 13 which is attachable to one of several selective points adjacent the upper end of a relay lever 14 from which may extend a cable or other connector 15 leading say to the upper end of the elevator arm 16, whereby to effect an upward course of the airplane when the timing roller 9 actuates the cam lever 9a, forwardly from the neutral position. Instead of a direct connection of the connector or cable 15 to the elevator arm, the cable may be first connected to an intermediate lever 17, Fig. 3, and this may be suitably connected to the arm 16, as structural conditions may dictate.

The cam roller 12 of the wheel 6, on the opposite side of the frame 2, is likewise engageable with a cam lever 12a having a connector for attachment to the lower end of the elevator arm 16 so that at a given time the elevator can be tipped downwardly for descent of the plane A.

The cam roller 10 of the wheel 5 is arranged to turn into engagement with the near edge of a cam lever 18 having a link 19 connected to the upper end of a relay lever 20, Fig. 1, which is connected directly or otherwise as by cable 21 to the left arm 22 of the rudder R, whereby to effect a left hand turn of the airplane at a predetermined time determined by the instant apparatus.

The cam roller 11 of the wheel 6 is arranged to turn into engagement with the near edge of a cam lever 23 having a link 24 connected to the upper end of a relay lever 25, Fig. 1, which is connected suitably as by a cable 26 to the right arm 27 of the rudder R, whereby at a determined time to effect a right hand turn of the airplane.

In the present disclosure the power of the master shaft 3 not only is used to actuate the several levers 9a, 12a, 18 and 23, at a given time for change of course of the vehicle, but the power is also used to actually work the control surfaces R, E and B, but it is understood that power to actuate these surfaces may be obtained from any other source the instant of utilization of which to work the surfaces can be controlled by connections combined with the said cam levers. In other words these cam levers may have their connectors, above mentioned, operate on simple electric motor switches of motors for the control surfaces.

In the use of a spring motor as here shown the master shaft 3 has a suitable train of gears T to a fast shaft 30 having a governor fan 31. A manual or safety latch 32 is provided on the frame 2 whereby to engage a wheel of the train T to hold the same stopped until its operation is desired. It is very desirable that the clock train may be automatically stopped at times and this is secured by a spring dog 33 normally pressed clear of a given gear of the train. This dog is connected by an elastic link or chain 34 to one end of a see-saw lever 35 pivoted on the frame 2 and having its opposite end operatively disposed in the orbit of a tappet roller 36 on the inner face of a slow gear 37 on a spindle 38 mounted in the frame 2. A plurality of such slow gears is mounted on the spindle 38 for the delayed function of such independent instruments as may be desired; the gears being driven by respective pinions 39 secured to the master wheels 5 and 6. The lever 35 is provided with a snap-action spring 40 to accelerate its stroke, and this lever may be used for such additional functions as desired; as by causing it to actuate any desired electric circuit switch such as the firing circuit of a combustion motor plant which may be used to propel the given vehicle. When the lever is snapped over it acts to instantly set the stop dog 33, of the gear train, in holding function.

It may in some cases be desired to close and hold closed some given electric circuit of some mechanism or instrument associated with the airplane or other vehicle for a given period of time. To do this the slow gear 37 is provided with a roller 41 to move against and repress a cam plate 42 held by a spring 43 in position to be abutted by the orbital roller. Repression of the plate causes it to engage and hold closed a suitable circuit breaker 44.

The rudder R and the ailerons B are connected in conventional manner for banking co-action, and if wing slots are in the wings of the airplane the elevator E is conventionally connected to the air slot valves.

What is claimed is:

1. In a timing mechanism; a power shaft, a speed controlling train for said shaft, a manually operative holding latch for the train, and an automatic stop means for the train including a slow gear driven by the shaft, a stopping dog device, and means on the said gear to operate said device, a plurality of independent work levers, and motivating wheels, mounted on and driven by the shaft, for the said levers, and cam rollers on said wheels for timed actuating engagement with the levers.

2. The mechanism of claim 1, and said wheels being mounted for free rotation, to given positions of the rollers, on the shaft.

CONSTANTINOS J. MAHERAS.